Oct. 10, 1944.  A. J. GILARDI  2,359,907
EDUCATIONAL DEVICE
Filed July 24, 1942  2 Sheets-Sheet 1
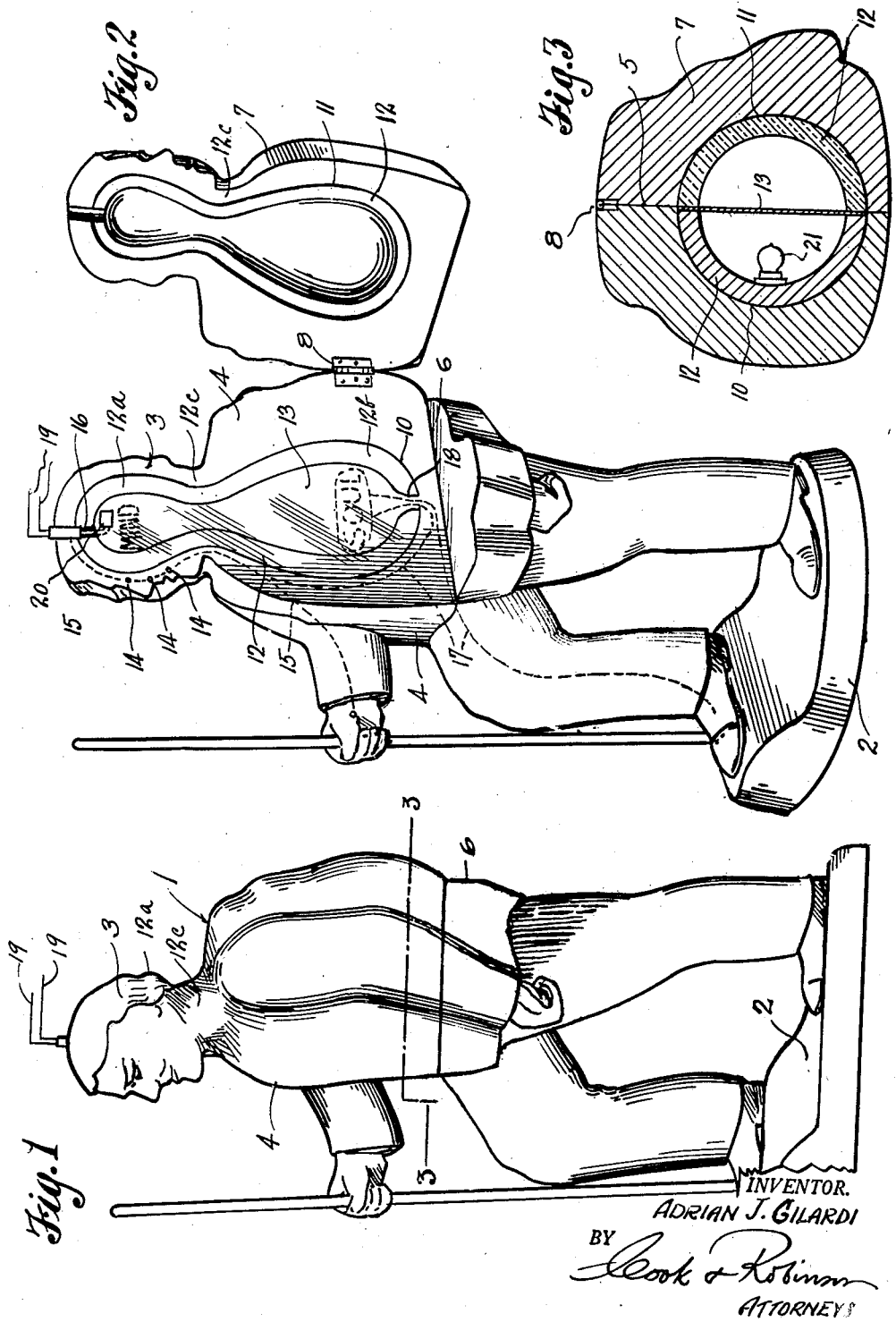
INVENTOR.
ADRIAN J. GILARDI
BY
Cook & Robinson
ATTORNEYS Oct. 10, 1944.  A. J. GILARDI  2,359,907
EDUCATIONAL DEVICE
Filed July 24, 1942  2 Sheets-Sheet 2
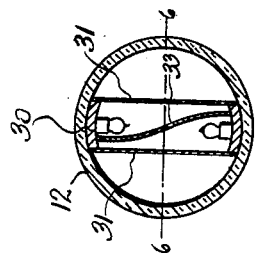
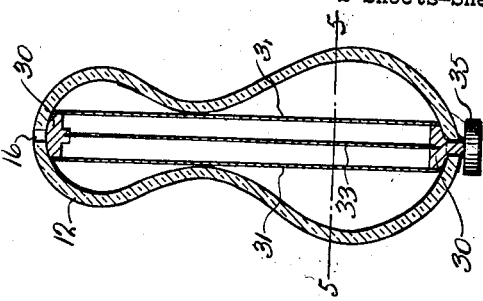
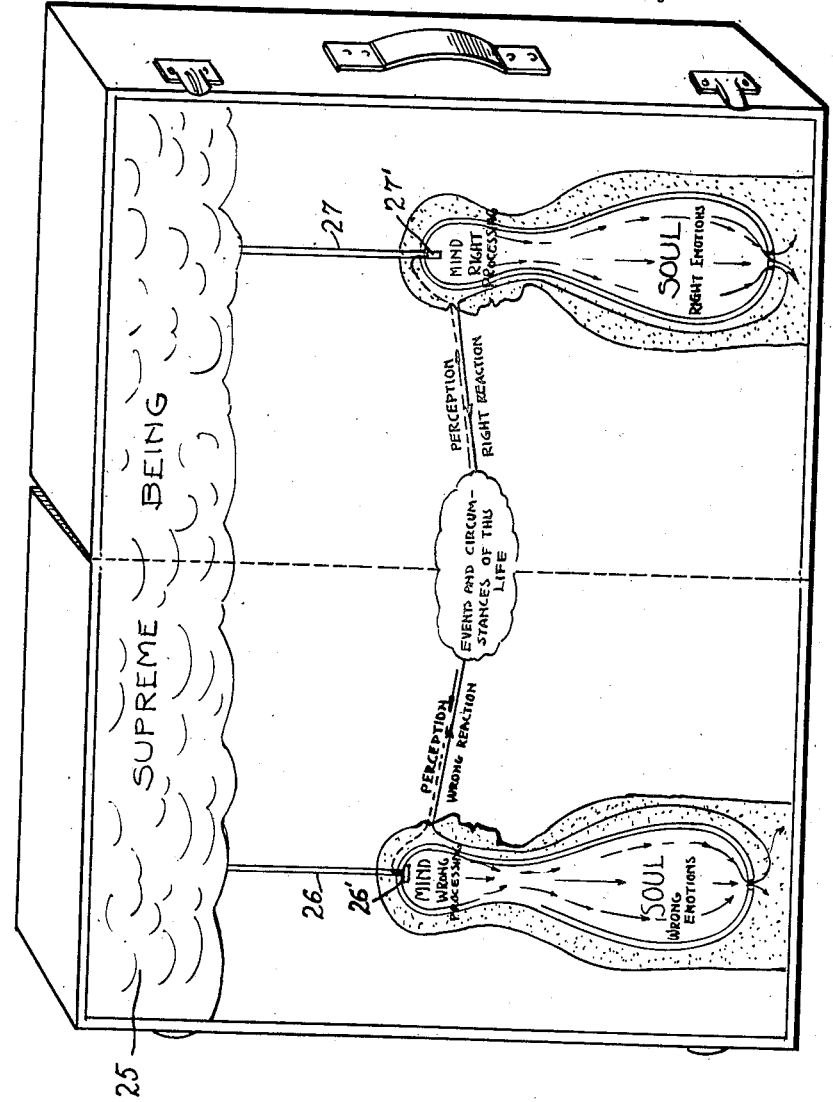
INVENTOR
ADRIAN J. GILARDI
BY
Cook & Robinson
ATTORNEYS Patented Oct. 10, 1944

2,359,907

UNITED STATES PATENT OFFICE 2,359,907

EDUCATIONAL DEVICE

Adrian J. Gilardi, Galveston, Tex.

Application July 24, 1942, Serial No. 452,145

7 Claims. (Cl. 35—22)

This invention relates to educational devices, and it has reference particularly to figures or apparatus designed to be used for acquiring or imparting a better understanding of, and for demonstrating visually and diagrammatically certain theories pertaining to the functioning, emotions and actions of the human being.

It is the principal object of this invention to provide an educational apparatus of the nature and for the purpose above stated, comprising a figure, preferably modeled after that of a human being, and representing the human body, as being equipped with parts enclosed or encased therein representative of the human mind and soul.

Another object of the invention is to provide means to show diagrammatically the complete sequence of steps within the human being, beginning with the perception of an event by the human senses and ending with the ultimate reaction.

A further object of the invention is to demonstrate diagrammatically the opposite results which will be obtained by applying opposite principles.

It is also an object of the invention to show the relationship of the individual human being to the Supreme Being, and the effect thereof on the human functions, emotions and actions.

Still further objects of the invention reside in the details of construction of parts embodied in the present demonstrating figures, and in their relationship and mode of use, as will hereinafter be described.

In accomplishing these and other objects of the invention, I have provided the improved details of construction, the preferred forms of which are illustrated in the accompanying drawings, wherein—

Fig. 1 is a side view of a figure, or statuette, of a type embodied by the present invention, as equipped with means for demonstrating diagrammatically the human functions and relationships involved in the invention.

Fig. 2 is a perspective view of the figure, showing the hinged portion swung to its open position to disclose the internal structure of the figure.

Fig. 3 is a cross section on the line 3—3 in Fig. 1.

Fig. 4 is a display case or flat box, preferably hinged in the middle for ease in transporting, of an alternate type embodied by the present invention, as equipped with means for demonstrating the human functions and relationships involved in the invention, as well as to show simultaneously a comparison of the different results of different principles of application.

Fig. 5 is a horizontal section on line 5—5 in Fig. 6, of an alternative type of interior housing to be used in the device.

Fig. 6 is a longitudinal section of the alternative device, taken on line 6—6 in Fig. 5.

Explanatory to the present invention, it will here be stated that the apparatus involved is primarily intended to be used in demonstrating and explaining certain teachings and theories, and is especially effective for that purpose when these teachings or theories are transmitted by lecture.

The principal teaching or theory is to the effect that a human being comprises three distinct parts, in all; namely, the body, the mind and the soul. In these present demonstrative or educational apparatus, the three parts are represented diagrammatically and in their general relation to each other. The material body is the outer shell or carrier, which in turn encloses the individual unit consisting of the mind and the soul in an inner housing. The mind and the soul are shown in the apparatus as concrete portions, for the purpose of visualization and to show their connection with the body.

The body is to be considered as a sensitive mass; that is, a mass equipped with senses and nerves whereby the functions of physical sensations and contact with the material world are fulfilled. It is to be considered in connection with this demonstration that the body cannot do any thinking or reasoning, has no will power and cannot have emotions.

The mind is to be considered as the seat of all mental ability and reasoning power, where all the thinking, planning, making of decisions and ordering take place.

The soul of the human being is to be considered as the seat of all will power, and emotions; having no senses, it makes no independent perceptions or observations, and does no independent thinking or reasoning.

The mind and the soul are very closely allied and practically merge into each other, and thus they form a self-contained unit in an inner housing, which has only one small inlet through which the nerves enter the mind, and a small outlet for outgoing nerves whereby the soul is connected with the various parts of the body. The human character is to be considered as the defender of the inlet to the mind.

Another teaching or theory covers the mechanics of the functioning of a human being.

While these mechanics are extremely complex and ramified, they can be easily described and demonstrated with the use of the present apparatus. Outer things, events and circumstances are perceived by the human senses and transmitted by the respective nerves which enter the mind through the small inlet. The impression is then submitted to the reasoning or mental processing. Opinions and decisions are reached which, in turn, influence the soul or seat of the will power. From the soul the control nerves go to the various parts of the body, thus regulating the movement of the limbs, the expression of the face, the vocal organs and other functions of the body.

Another teaching or theory covered is that the mind is the control station of the entire human being. If the mental processing is wrong, the opinions, decisions, emotions and actions will be wrong. If the mental processing is right, the opinions, decisions, emotions and actions will be right.

A further teaching or theory covers the relationships of the individual human being to the Supreme Being. If the mental processing is wrong, this relationship is severed, while, if the mental processing is right, the relationship is established, with highly beneficial results all around.

Referring more in detail to the drawings—

1 designates in its entirety, a figure representative of the body of a human being. This figure may be carved, cut or molded of any material that is suitable for the purpose. As here shown, the figure is mounted upon a base or pedestal 2, and that portion of the figure comprising the head 3 and trunk 4 of the body, is vertically divided from front to back along the line 5 in Fig. 3, and the forward section is separated by a horizontal cut as at 6, from the lower portion so that it may be displaced in such manner as to expose the interior of the body. Preferably, the section thus detached, designated by numeral 7, is provided with a hinge mounting, as at 8, so that it may be swung between its open and closed positions, as illustrated in Fig. 3.

The head 3 and the trunk 4 of the body are hollowed out as at 10 and 11, and within the recess is fitted a hollow housing 12 which is longitudinally divided as seen in Fig. 3, and which in the vertical plane through line 5 in Fig. 3, has one-half section covered by a translucent panel 13 of material which may be cloth, glass or other suitable material, on which diagrams or notations may be marked or printed for purpose of explanation. As will be noted in Fig. 2, the hollow housing 12 has a head portion 12a which contains the mind, designated by the word "Mind," and a lower body portion 12b which contains the soul, designated by the word "soul"; the two portions 12a and 12b being joined by the restricted neck portion 12c. The front section of the housing is preferably made of glass or other transparent material, while the back half may be of any suitable material. Also, the housing 12 may be removable from the body as a whole, to emphasize the independence of this part from the body.

The human senses, indicated at 14, and which are outside the housing 12 as observed in Fig. 2, are connected with the mind by means of threads, or thin wires 15 passing through a small inlet 16 at the top of housing 12. Likewise, the soul is connected with the various parts of the body by the outgoing nerves represented by threads or thin wires 17, passing through an outlet 18 at the lower end of housing 12.

Two figures of a kind might be used together, one with a translucent panel bearing the notation of the right mental processing, right opinions, right emotions and right actions, and the other figure with a translucent panel bearing the notation of all these things being wrong instead. As an alternative, the same figure might be employed to demonstrate the right sequence on a translucent panel over the half of the housing which fits in recess 10, and the wrong sequence on a translucent panel applied to that half of the housing which fits in recess 11.

An electrical circuit is used to show the relationship of the individual human being with the Supreme Being. The Supreme Being is simulated by a central power station or other power source which is not visible and which supplies the electrical energy to the circuit. The circuit is composed of the wires 19 leading to a switch 20 just inside the housing, and from there to the incandescent lights 21 in the interior of the housing. If the mental processing is right, the switch is closed to demonstrate the contact of the individual human being with the Supreme Being, and the lights representing the flow of divine light and power will burn, illuminating the "right" translucent panel accordingly. If the mental processing is wrong, the switch is open, to demonstrate the severance of the relationship with the Supreme Being, and only a flashing light will burn, as a warning, thus illuminating the "wrong" translucent panel accordingly.

As another alternative, the horizontal cut 6 in Fig. 1 might be extended through the entire body, and the lower part thereof be omitted entirely, using only the opposite halves of this bust hinged together or entirely separated.

As a further alternative, the figure might be made two-dimensional only, preferably as a right and left pair, as shown in Fig. 4, to demonstrate simultaneously the "right" and "wrong" sequences, and the opposite results thereof; an electrical circuit may be added to illuminate the translucent panels on which is a cloud representation 25 of the Supreme Being, with which the mind and the soul of the "right" and "wrong" sequences are electrically connected through wires 26 and 27 for the purpose of demonstrating the relationship of the individual human being to the Supreme Being as affected by the "right" and "wrong" sequences. Control switches 26' and 27' are incorporated in the circuit connections 26 and 27.

As a further alternative, a combination of the two-dimensional method of construction shown in Fig. 4, with that of Fig. 2, might be used by adding recesses with a retractable complete housing to represent the individual unit.

In Figs. 5 and 6 has been illustrated still another alternative housing 12. This contains an interior frame 30 rotatably fitted in the housing 12 to rotate about the longitudinal axis. This frame has spaced, translucent opposite side panels 31—31 on which the desired inscriptions of right and wrong processing can be placed, and selectively exposed by rotating the frame. In the frame is a partition 33 and separate illumination is provided at opposite sides of this partition for the two panels. A turning knob 35 is fixed to the lower end of the housing. It is anticipated that such a housing might replace that as shown in Figs. 2 and 3.

The various devices, as above described, have been found very effective for the purpose of demonstrating the teachings and theories discussed and in bringing about improvement through the visual clarification of the basic principles involved. It is recognized that they might be used for various demonstrations, other than mentioned, by the placing of the required or proper designations or information on the translucent panels, which will become discernible by the use of lights at the proper locations within the hollow housings.

Having thus described my invention, what I claim as new therein and desire to secure by Letters Patent is:

1. An educational device of the character described comprising a material figure including a representation of the head and trunk portion of a human being and having a section of the head and trunk portion separable therefrom along a longitudinal plane, for displacement from normal position relative to the figure, and having an interior surface of the head and trunk portion adapted to be exposed to view by the displacement of said section, and formed with a recess extending substantially over the entire area of said exposed surface, and a hollow housing fitted in and displaceable from said recess and having a translucent cover portion adapted for the display of inscriptions and diagrams thereon, and means interiorly of the housing for illuminating the said translucent cover portion from the rear.

2. An educational device of the character described comprising a material figure representative of the body of a human being and having a section of the head and trunk portion separable from the main body along a longitudinal plane and hingedly attached for movement from and into normal position relative to the main body and providing an interior surface through the head and trunk portion of the figure adapted to be exposed to view by the displacement of said hinged section; said surface being formed with a recess extending substantially over its entire area, and a hollow housing fitted in and displaceable from said recess, a translucent cover portion applied to the housing and adapted for the display of inscriptions and diagrams thereon, and means interiorly of the housing for illuminating the said translucent cover portion from the rear.

3. A device as set out in claim 2, wherein the interior surface of the hinge section will be exposed to view upon the opening of the section outwardly from the main body; said surface having a recess therein, a hollow housing fitted in and displaceable from the recess, a translucent cover for the housing on which inscriptions may be marked, and means inside the housing for illuminating the cover.

4. A display box comprising complemental hingedly joined sections adapted to be closed together, and to be opened apart to expose their inside surfaces to view and having characters delineated thereon representing complemental portions of the human body, there being coinciding recesses in said surfaces within the characters, translucent cover members overlying the recesses for the inscribing of material thereon, and means within the recesses for illuminating the cover members.

5. An educational device of the character described comprising complemental half sections forming a material figure including a representation of the head and trunk portion of a human being and having one half section of the head and trunk portion separable from the other half section along a longitudinal line from front to back; said half sections of the figure having adjacent surfaces formed with registering recesses, a housing having complemental half portions fitted in the recesses of said sections of the figure respectively and adapted to be retained in one recess when the other half section of the figure is separated therefrom; the exposed portion of the housing being transparent, and there being a translucent inscription panel located between the half portions of the housing, and means for the illumination of the panel from the rear.

6. An educational device of the character described, comprising a material figure including a representation of the head and trunk portion of a human being and having one half section of the head and trunk portion thereof separable from the other along a longitudinal plane from front to back; said half sections of the figure having adjacent surfaces recessed, a transparent housing contained in said recess and adapted to be held in one recess and exposed to view by the separation therefrom of the other section of the figure; a frame rotatable in said transparent housing about a longitudinal axis and having spaced, transparent inscription panels on opposite side walls of the frame, means inside the frame for the illumination of the panels and means for turning the frame on its axis to selectively expose the panels to view.

7. An educational device comprising a surface on which is a representation of the trunk and head portion of a human being, and formed in the body of said representation with a recess and a member applied within said recess and rotatably mounted therein for adjustment for the display of notations made on different sides thereof in conjunction with the representation of the human being.

ADRIAN J. GILARDI.